Oct. 18, 1960 A. E. GRAY ET AL 2,956,803

CARD PROCESSING APPARATUS

Filed Feb. 21, 1957 2 Sheets-Sheet 1

INVENTORS:
Alfred E. Gray
Herman J. Malin
Harold B. Thompson

By Smyth & Roston

Attorneys

Oct. 18, 1960 A. E. GRAY ET AL 2,956,803

CARD PROCESSING APPARATUS

Filed Feb. 21, 1957 2 Sheets-Sheet 2

INVENTORS:
Alfred E. Gray
Herman J. Malin
Harold B. Thompson

By Smyth & Roston

Attorneys

United States Patent Office 2,956,803 Patented Oct. 18, 1960

2,956,803

CARD PROCESSING APPARATUS

Alfred E. Gray, Culver City, Herman J. Malin, Los Angeles, and Harold B. Thompson, Playa Del Rey, Calif., assignors to Magnavox Company, Los Angeles, Calif., a corporation of Delaware Filed Feb. 21, 1957, Ser. No. 641,752

9 Claims. (Cl. 271—28)

Figures 1, 2:
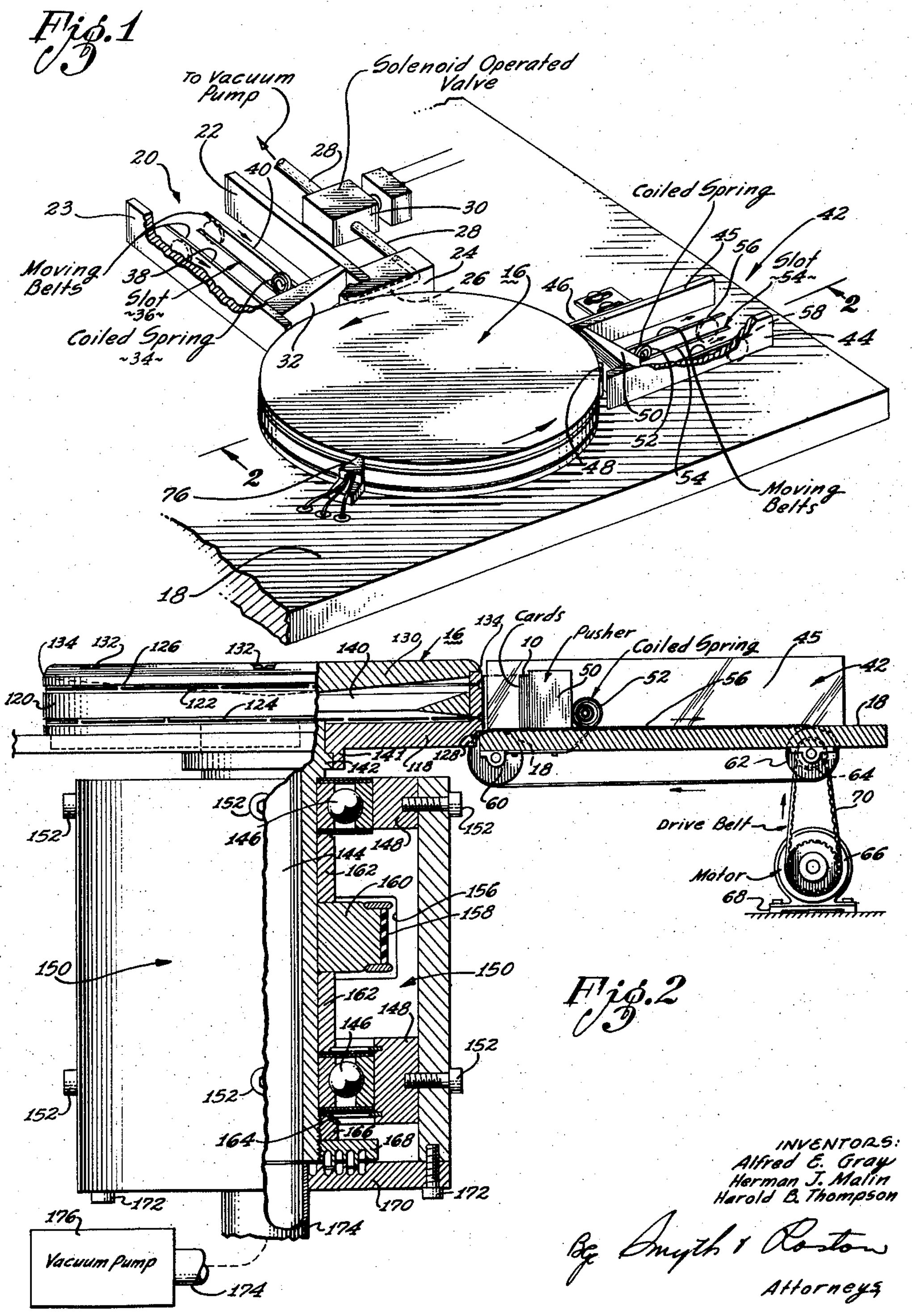

The invention relates to apparatus for handling and transporting information storage cards for data processing purposes. The invention is more particularly directed to apparatus which includes an improved card holding station, this station being constructed so that unwanted frictional drag between the cards and the floor of the station is reduced to a minimum as the cards are moved in and out of the station.

In most known types of data processing systems, the information to be processed is recorded on a plurality of separate information storage cards. The information may be recorded on the individual cards in the form of holes, the holes being patterned in accordance with a selected code to represent the information. Alternately, the information may be recorded on the cards in the form of magnetic areas of one polarity or the other. The illustrated embodiment of the invention will be described as utilizing cards with the information or data recorded magnetically on the surfaces of the individual cards and in accordance with magnetic techniques. It will be evident as the description proceeds, however, that the apparatus of the invention is susceptible for use in a wide variety of types of data processing systems in which the data to be processed is recorded on cards in any appropriate way.

It is usual in data processing systems to transport the information storage cards successively from a feeding station at which the cards are stored to a sensing station at which they are processed. In a preferred type of data processing system, rotatably mounted vacuum pressure drums are used to perform this transporting function. Such a transporting drum will be described in detail subsequently in the present specification.

In the system described above, the information cards are held in stacked relation against the periphery of the transporting drum. The cards are so held in a suitable card holder at the feeding station. A transfer mechanism is usually provided for intermittently or continuously feeding the cards in succession from the card holder to the rotatable transporting drum. A stacking station including a similar card holder is provided for receiving the cards after they have been processed at the sensing station. The stacking station has an appropriate mechanism for transferring cards from the periphery of the transporting drum to the card holder at the stacking station.

Relatively complex data processing systems use thousands of information storage cards, and these cards collectively have millions of bits of significant data recorded on them by any of the processes referred to above. In order to reduce processing time as much as possible, it is important that the cards move at a high rate of speed from the transporting drum into the card holder at the stacking station, and out of the card holder at the feeding station to the transporting drum. One factor that has militated against the desired high rate of speed of card transfer into and out of the card holders has been the frictional drag between the lower edges of the cards and the supporting surface or floor of the card holders. This frictional drag operates in a direction for misaligning the cards and may sometimes have a tendency to deform and damage the cards at high transfer speeds.

The present invention eliminates this frictional drag for all practical purposes. It accomplishes this function by the provision of one or more movable conveyor belts on the card supporting surface or floor of each card holder. These conveyor belts move in the direction of motion of the cards in the particular holders, and they effectively eliminate the effect of friction drag discussed above. This permits a material speed-up in the system with which the apparatus of the invention is associated, and it permits the rapid feed of cards into and out of the card holders without any danger of the cards becoming misaligned and damaged.

A pusher member is incorporated in each of the card holders described above. This pusher is spring-biased toward the mouth of the card holder with which it is associated. In the apparatus of the present invention, the pusher is independent of the conveyor belts. The pusher functions to urge the cards toward the front of the card holder and thereby to press the leading card in the stack against the periphery of the transporting drum. Then, in the stacking station for example, as cards are fed into the card holder they are firmly maintained in closely stacked relation by the pusher member. However, regardless of the number of cards in the stack, additional cards are able to enter into the stack in spite of the number of cards already in the stack. This results from the counter-force exerted on the pusher by the cards already in the stack to move back the pusher.

Since there is no appreciable frictional drag on the lower edges of the cards as they are fed into or out of the card holder, this feeding may proceed as rapidly as desired. Thus, as the cards are fed from the transporting drum into the card holder of the stacking station, they are maintained in stacked relation by the pusher member. Furthermore, the cards move the pusher back against the force exerted on the pusher by the spring. The cards move the pusher back without any dragging of the cards on the supporting surface of the card holder. This drag, as mentioned above, might sometimes tend to misalign the cards and might sometimes tend to cause the cards to become damaged.

For a stacking station in which the cards are fed from the transporting drum to the card holder included in the station, the conveyor belts are constructed to move in a direction away from the drum. This corresponds to the direction of movement of the cards already in the card holder as additional cards are transferred into the holder. However, for a feeding station in which the cards are fed to the drum from the card holder included in the station, the conveyor belts move in the opposite direction and toward the drum to perform their intended function. This corresponds to the direction of movement of the cards in the card holder as cards become transferred to the drum from the card holder. Suitable drive motors and pulleys are provided in each type of station, as will be described, for causing the conveyor belts to move in the proper direction.

When reversible stations such as the stacking-feeding station described in copending application Serial No. 645,639, filed March 12, 1957 by Minoru T. Endo et al. are modified in accordance with the present invention, reversible motors may be utilized to drive the conveyor belts. These motors may be coupled to the mechanisms which control the operating modes of the station. For example, the motors may be energized by the control mechanisms to move the conveyor belts in a direction away from the transporting drum when the station is activated as a stacking station. Alternately, the motors may be energized by the control mechanisms to move the conveyor belts toward the transporting drum when the station is activated to function as a feeding station.

Figure 3:
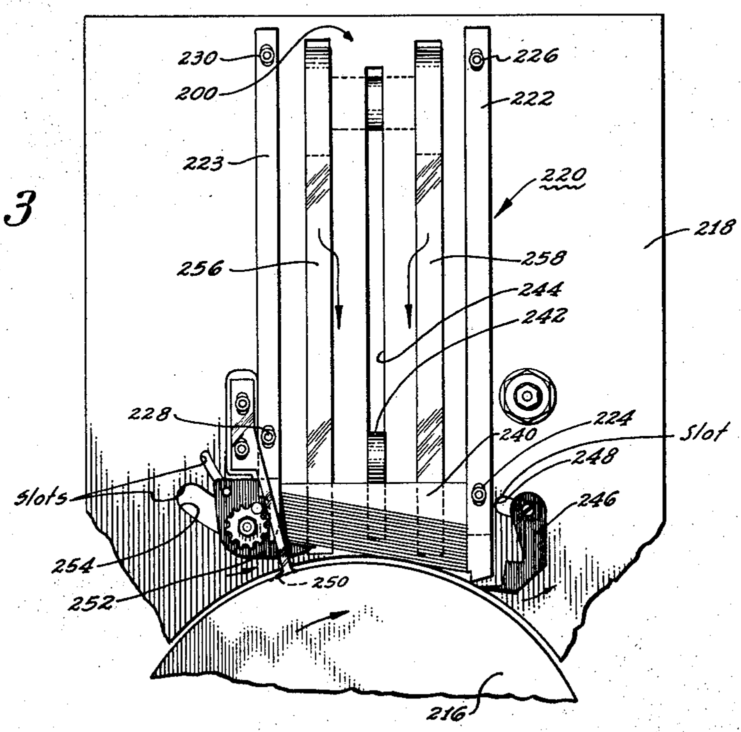
Figure 4:
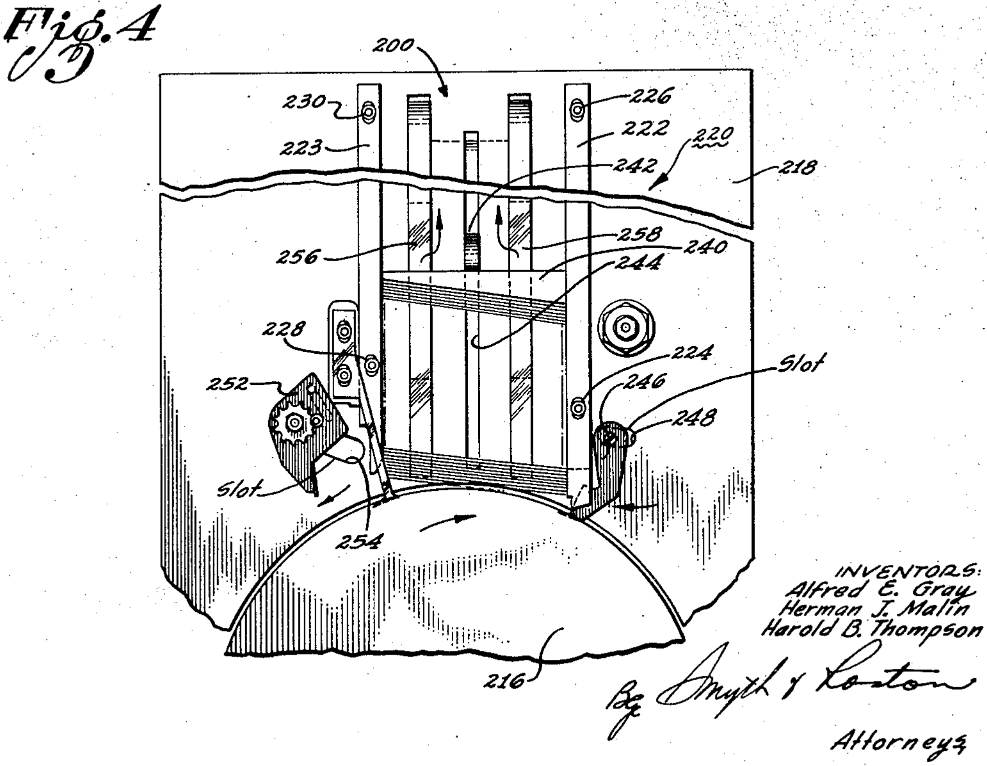

The invention will be more clearly understood from the following detailed description, taken in conjunction with the accompanying drawings which illustrate embodiments of the invention and in which:

Figure 1 is a fragmentary perspective view of a card processing system utilizing apparatus constructed in accordance with one embodiment of the invention and particularly illustrates a rotatable vacuum transport drum and means including feeding and stacking stations associated with the drum for effectively eliminating the drag of the information cards on the card supporting surfaces of the stations as the cards are fed into or out of the respective stations;

Figure 2 is a partially sectional view, substantially on the line 2—2 of Figure 1, and shows the constructional details of the vacuum transporting drum utilized in the system of Figure 1 and also shows details of a stacking station and a movable conveyor mechanism which is incorporated in the station in accordance with the invention;

Figure 3 is a fragmentary top plan view of a reversible stacking-feeding station in a card processing system and of a conveyor mechanism in the station for reducing frictional drag in a manner to be described, the station being shown in its feeding condition in this figure; and Figure 4 is a top plan view of the reversible station, similar to the view of Figure 3, but with the station in its stacking condition.

The card processing system shown in Figure 1 is a somewhat simplified representation. This system is intended to show a typical use for the apparatus of the present invention. The apparatus and system shown in Figure 1 includes a vacuum transporting drum 16 which is rotatably mounted on the top 18 of a suitable table or other supporting surface. The drum 16 will be described in detail with reference to Figure 2. This drum serves as a transporting means for information cards used in the system, and it firmly supports the cards on its peripheral surface by vacuum pressure in a manner to be described.

A feeding station is positioned on the table top 18 adjacent the rotatable drum 16. This feeding station includes a card holder which is represented generally at 20. This card holder includes a pair of spaced parallel walls 22 and 23 which are positioned to have their leading edges disposed adjacent the periphery of the drum 16, and these walls extend generally away from the drum 16 in a radial direction. The wall 23 constitutes the trailing wall of the card holder 20 with respect to the direction of rotation of the drum 16. This direction in the illustrated embodiment is assumed to be counterclockwise. The front end of the wall 23 is spaced from the periphery of the drum 16 a short distance so as to define a "throat" between the wall and the drum. The width of this throat is such that only a single card may pass between the front end of the wall and the periphery of the drum 16. The significance of this will become apparent as the description proceeds.

The wall 22 forms the leading wall of the card holder 20 with respect to the direction of rotation of the drum 16. A retainer 24 is positioned adjacent the periphery of the drum 16, and this retainer extends across the front end of the wall 22 and partially across the mouth of the card holder 20. The retainer 24 is spaced radially from the periphery of the drum 16 a sufficient distance to permit cards transported on the periphery of the drum 16 to pass between the retainer and the drum. The retainer 24 may be similar in its construction to the mechanism disclosed and claimed in copending application Serial No. 552,506, filed December 12, 1955 for Hans M. Stern.

The cards are supported in the card holder in a generally vertical position and with their lower edges resting on the floor or card supporting surface of the card holder. The leading card has a forward portion of its front face engaging the periphery of the drum 16 and also has a trailing portion of its front face engaging a face of the retainer 24. One or more orifices are formed in this face of the retainer, and a conduit 26 extends through the retainer from these orifices.

When a vacuum pressure is created at the orifices in the face of the retainer 24 against which the leading card rests, this vacuum pressure is adequate to retain the leading card in the card holder 22 against the vacuum force exerted by the drum 16 in a direction for withdrawing that card. However, when the vacuum pressure to the retainer 24 is interrupted, the leading card is withdrawn through the throat formed by the front end of the wall 23 and is carried on the periphery of the drum 16. The throat assures that only one card at a time will pass from the card holder 20 to the periphery of the drum 16. The next card in the card holder takes the place of the leading card so that the process may be repeated.

An air feed line 28 couples the conduit 26 in the retainer 24 to an appropriate vacuum pump (not shown). A solenoid-actuated valve 30 is provided in the feed line 28. This solenoid actuated valve may have any known construction. When an energizing current is passed through the solenoid portion of the valve 30, the valve is closed to interrupt the vacuum pressure at the orifices in the surface of the retainer 24. Therefore, by selectively energizing the solenoid valve 30, the feed of cards from the card holder 20 to the periphery of the drum 16 can be conveniently controlled.

A pusher member 32 of generally triangular form is provided in the card holder 20 at the feeding station. This pusher member extends across the card holder between the walls 22 and 23. The pusher is adapted to move in the card holder in a direction generally parallel to the walls 22 and 23. The pusher is normally biased to the front or mouth of the card holder by means of a coiled, resilient spring 34 which is secured to the under side of the card holder 20 and which is disposed in a slot 36. The coiled resilient spring 34 is under compression so as to act to urge the pusher 32 toward the mouth of the card holder.

When a stack of cards is placed in the card holder 20, the pusher 32 may be moved manually to the rear of the card holder. It may then be released so as to be biased by the spring 34 against the stack. This arrangement causes the cards to be firmly maintained in abutting relationship with each other in the card holder and at the proper inclination across the holder with respect to the engaging surface of the retainer 24 and to the periphery of the drum 16. By holding the cards tightly against one another, the cards become disposed in a stack.

A pair of movable conveyor belts 38 and 40 are supported on the card supporting surface of the card holder 20. The belts are positioned to be generally parallel to the walls 22 and 23. The conveyor belts themselves are generally parallel to one another, and they are adapted to move in this particular holder in a direction parallel to the walls 22 and 23 and towards the front of the card holder 20. The conveyor belts 38 and 40 are mounted on rollers and are driven by a suitable electric motor. These rollers and the electric drive motor are not shown in Figure 1, but the rollers and drive associated with similar conveyor belts are shown in Figure 2 and will be described in detail subsequently.

A stacking station is also positioned on the table top 18 adjacent the drum 16. This stacking station includes a card holder 42 defined in part by a pair of spaced parallel walls 44 and 45. The walls 44 and 45 are mounted on the table top 18 and extend in a radial direction outwardly from the periphery of the drum 16. The wall 44 constitutes the leading wall of the card holder 42 with respect to the direction of rotation of the drum 16, and the wall 45 constitutes the trailing wall.

A stop member 46 is positioned on the table top 18 adjacent the trailing wall 45. The front edge of the stop 46 extends toward the periphery of the drum 16 to a position slightly displaced from the drum periphery. A stationary pawl 48 is positioned adjacent the leading wall 44 of the card holder 42. This pawl has fingers which extend into grooves in the periphery of the drum 16 and it has a humped central portion. The arrangement is similar to that described in copending application Serial Number 562,154, filed January 30, 1956, by Stuart L. Peck et al.

Cards transported by the periphery of the drum 16 ride over the pawl 48 and are arrested by the stop 46. The pawl 48 is displaced slightly in the direction of rotation from the wall 44 such that the trailing edge of an arrested card projects over the top of the pawl. Then, the next succeeding card passes under the previous card and over the pawl into engagement with the stop 46. This enables the succeeding card to deposit the previous card in the card holder 42, and it assures that the cards will be so deposited in the card holder in the proper order. In this manner, succeeding cards transported by the periphery of the drum may be deposited in the card holder 42.

A pusher member 50 is included in the card holder 42, and this pusher may have a configuration generally similar to the pusher 32 at the feeding station. The pusher 50 is movable back and forth in the card holder 42 in a direction generally parallel to the walls 44 and 45. It is biased toward the mouth of the card holder 42 by a coiled, resilient spring 52 which is disposed in a slot 54 under compression in a manner similar to that described previously for the slot 36. As in the feeding station, the coiled spring 52 tends to bias the pusher 50 toward the mouth of the stacking station.

A pair of movable belts 56 and 58 are mounted in the card holder 42, and these belts extend parallel to the walls 44 and 45 of the card holder. The conveyor belts 56 and 58 are controlled to move in a direction parallel to the walls 44 and 45 and away from the periphery of the drum 16.

As shown more clearly in Figure 2, the conveyor belt 56, for example, is mounted on a pair of rollers 60 and 62. The roller 60 is rotatably mounted under the table top 18 adjacent the mouth of the card holder 42. The roller 62 is rotatably mounted under the table top 18 adjacent the back end of the card holder 42.

A suitable driving means such as a sprocket wheel 64 may be mounted concentrically with the roller 62 in driving relation with the roller. An electric motor 66 is mounted on a stationary bracket 68 under the table top 18, and a drive chain 70 (or other appropriate driving means) couples the drive shaft of the motor to the sprocket 64. The roller 60 may be mounted on a common shaft with a similar roller for driving the conveyor belt 56. Likewise, the roller 62 may be mounted on a common shaft with a similar roller for driving the conveyor belt 56. The motor 66, therefore, may be energized to drive the conveyor belts 56 and 58. The drive of these belts in this particular station is in a direction away from the mouth of the card holder 42 and from the periphery of the drum 16.

A suitable transducer means 76 is mounted on the table top 18, and this transducer means is disposed in operative relationship with the periphery of the drum 16. The transducer means 76 may have any other known and usual construction. It is positioned on the table top between the feeding station and the stacking station, and its function is to process cards from the feeding station in known manner as they are transported on the drum 16 to the stacking station.

For processing purposes, a plurality of cards in stacked relation are placed in the card holder 20. These cards are held in their stacked relation by the pusher 32 and are urged by the pusher towards the mouth of the card holder 20 and against the surface of the retainer 24 and against the peripheral surface of the drum 16. As noted above, the conveyor belts 38 and 40 are controlled to move toward the mouth of the card holder 20.

Therefore, when the solenoid valve 30 is controlled to cause the retainer 24 to release cards from the card holder 20 to the periphery of the drum 16, these cards move in a one-by-one sequence through the throat formed between the end of the wall 23 and the periphery of the drum. As the cards are so released, the stack of cards in the card holder 20 is moved toward the front of the card holder as a result of the action of the coiled spring 34 in the pusher 32. As described previously, the speed with which cards in the prior art systems could be transferred from the card holder 20 to the drum 16 was limited by the frictional drag of the bottom edges of the cards on the card supporting surface or floor of the card holder 20. However, in the illustrated embodiment of the invention the conveyor belts 38 and 40 move the lower edges of the cards forwardly in the stack and eliminate for all practical purposes this frictional drag.

In like manner, the cards become deposited in the card holder 42 at the stacking station after they have been processed by the transducing means 76. The cards become deposited in the card holder 42 in stacked form. As successive cards are fed to the card holder, the resultant growing stack of cards forces the pusher 50 back against the coiled spring strip 52. At the same time, the lower edges of the cards are moved towards the rear of the card holder 42 by the conveyor belts 56 and 58.

The force exerted on the cards by these conveyor belts is less than the spring-bias of the coiled spring 52 on the pusher 50. Therefore, individual cards which tend to be moved toward the rear of the card holder by the conveyor belts do not succeed in moving the pusher 50, and the pusher firmly maintains the cards in a closely stacked condition. However, the cards may be rapidly fed to the card holder 42 because the effect of friction drag on their lower surfaces has been removed, and the cards quickly move to a stacked condition against the front of the pusher 50 and do not tend to become misaligned.

Details of the vacuum transporting drum itself are shown in Figure 2, and this drum may be constructed in the manner similar to the drum disclosed and claimed in copending application Serial No. 600,975, filed July 30, 1956 in the name of Loren R. Wilson.

As shown in Figure 2, the vacuum transporting drum 16 is made up of a lower section and an upper section. The lower section includes a disk-like bottom portion 118 and an annular side portion 120 integral with one another. A pair of axially spaced peripheral orifices 122 and 124 extend through the side portion 120. Each of the peripheral orifices is discontinuous in that it is interrupted at selected intervals about its periphery by ribs 126 integral with the side portion 120.

The disk-like bottom portion 118 of the lower section is undercut in the manner taught in the copending Wilson application, as shown at 128 in Figure 2. This is so that at least the end of this portion will have a reduced diameter with respect to the outer diameter of the annular side portion 120. This enables the table top 18 to extend beyond the outer limits of the side portion 120. Therefore, even without excessively close tolerances between the edge of the table top 18 and the rotating surface of the drum 16, the cards supported endwise on the table top in the card holder 42 have no tendency to slip down between the table and the drum and become misplaced and damaged.

The upper section of the drum 16 is in the form of a disk-like member 130 which engages the annular side portion 120 of the lower section. The upper section 130 forms an enclosure with the lower section of the drum, with the upper section parallel to the disk-shaped bottom portion 118 of the lower section. The upper section 130 is held in place on the side portion 120 by a series of screws 132. The upper section 130 is also undercut as shown at 134 and has a smaller diameter than the outer diameter of the annular side portion 120 of the lower section.

When one of the cards is fed from the card holder 20 to the drum 16 it is held on the outer peripheral surface of the annular side portion 120 by vacuum pressure in a manner to be described. It is desirable that the cards be fed to this peripheral surface in an accurately oriented position so that they may be properly processed in the system. The walls 22 and 23 of the card holder 20 cooperate with the table top 18 to direct the cards to the peripheral surface of the portion 120.

A deflector ring 140 is supported within the interior of the drum 16 in press-fit with the inner surface of the annular side portion 120. This deflector ring is tapered toward the center of the drum to prevent turbulence and provide a streamlined path for air that is drawn in through the orifices 122 and 124. Moreover, the under surface of the upper section 130 is bulged to have a convex shape. This convex shape also aids in providing a smooth path for the air drawn in through the orifices 122 and 124.

The portion 118 of the lower section of the drum 16 contains a central opening surrounded by an annular collar 141. The collar 141 surrounds a collar 142 provided at one end of a hollow shaft 144. The drum 16 is supported on a shoulder formed by the collar 142 and the end of the shaft extends into the opening of the portion 118 in friction-fit with that portion. Therefore, rotation of the hollow shaft 144 causes the drum 16 to rotate. Also, the shaft 144 communicates with the interior of the drum. Bearings 146 are provided at opposite ends of the shaft 144. The inner races of the bearings 146 are mounted on the shaft 144, and the outer races of the bearings are disposed against bushings 148 secured to a housing 150 by studs 152.

An arcuate opening 156 is provided in the housing 150 between the bearings 146. This opening enables a drive belt 158 to extend into the housing and around a pulley 160. The pulley 160 is affixed to the shaft 144 between the bearings 146 and is held against axial movement by sleeves 162. In this way, the shaft 144 and the drum 16 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft and a lock washer 164 is interposed between it and the lower bearing. A sealing disk 168 is also screwed on the threaded portion at the bottom of the shaft 144. The sealing disk 168 operates in conjunction with a bottom plate 170 to resist the movement of air between the interior of the housing 150 and the interior to the hollow shaft 144 when a pressure differential exists between the housing and the shaft. The bottom plate 170 is secured to the housing 150 by studs 172, and it has a central circular opening. A hollow conduit 174 extends into the opening in friction-fit with the plate 170. The conduit 174 is axially aligned with the hollow shaft 144 so that air may be exhausted from the hollow interiors of the shaft and the conduit by a vacuum pump 176. The vacuum pump may be of any suitable known construction and, for that reason, is shown merely in block form.

The vacuum pump 176 draws air in through the orifices 122 and 124 and through the interior of the drum 16 down the shaft 144 and through the conduit 174. This creates a vacuum pressure at the outer-peripheral surface of the annular portion 120 of the lower section of the drum 16. This vacuum pressure that is so created around the outer surface of the annular portion 120 of the drum serves to firmly retain the cards on that surface as they are transported by the drum.

The reversible feeding-stacking station of Figures 3 and 4 may be similar in its constructional details to the station disclosed and claimed in copending application Serial No. 645,639.

The reversible feeding-stacking station of Figures 3 and 4 is illustrated as positioned adjacent a vacuum transporting drum 216 which is assumed to be rotating in a clockwise direction. The drum 216 is shown only in fragmentary form, and it may be similar in its construction to the vacuum transporting drum 16 described above. The reversible station includes a base plate 218 which forms the floor of the station and which serves the same purpose as the table top 18. A card holder 220 is included at the station, and this card holder has a pair of spaced parallel side walls 222 and 223. The wall 222 is secured to the base plate 218 by screws such as the screws 224 and 226, and the side wall 223 is secured to the base plate by screws such as the screws 228 and 230.

A pusher member 240 is positioned in the card holder 220 and is adapted to move back and forth in the card holder in a direction generally parallel to the walls 222 and 223. The pusher 240 may have a similar configuration to the pusher 32 of Figure 1. A coil spring 242 is mounted on the base plate 218, in constrained relationship within a slot 244 in the base plate. This coil spring biases the pusher 240 toward the mouth of the card holder 220 in a manner similar to that described previously in connection with the embodiments shown in Figures 1 and 2.

The reversible station of Figures 3 and 4 includes a stop member 246. This stop member is pivotable and is also movable in a slot 248 in the base plate 218. In the manner fully described in copending application Serial No. 645,639 the stop member 246 may be moved to the position shown in Figure 4 such that it is interposed between the end of the wall 222 and the periphery of the drum 216. The stop member 246 may also be moved to the position shown in Figure 3 such that it is retracted away from the periphery of the drum. The end of the wall 222 is spaced from the periphery of the drum 216 by a distance sufficient to allow one card only to pass between it and the drum. The end of the wall 222, therefore, forms a throat for the cards with the periphery of the drum 216.

When the stop 246 is in its retracted position of Figure 3, cards may be fed in a one-by-one sequence from the card holder 220 to the periphery of the drum 216. On the other hand, when the stop 246 is moved into the throat between the wall 222 and the periphery of the drum 216 to its position of Figure 4, it functions to arrest cards transported on the drum 216.

A pawl 250 is mounted on a stationary bracket (not shown) and this pawl functions in a manner similar to the pawl 48 of Figure 1 to assist the stop 246 in depositing cards from the drum 216 to the card holder 220 when the stop is in its position of Figure 4.

A retainer member 252 is pivotally mounted adjacent the end of the wall 223. The retainer 252 is pivotable in a manner fully described in copending application Serial No. 645,639 and also moves in a slot 254 in the base plate 218. The retainer 252 moves in unison with the stop 246. This unison motion is such that when the stop 246 is retracted from the throat between the wall 222 and the drum 216 to its position of Figure 3, the retainer 252 moves forwardly to an operative position also shown in Figure 3, on the other hand, when the stop 246 is moved into the throat to its position shown in Figure 4, the retainer 252 is retracted back along the slot 254 and simultaneously pivoted to an inoperative position shown in Figure 4.

When the retainer 252 is in its operative position of Figure 3, a vacuum pressure may be exerted at its surface in the same manner as the retainer 26 of Figure 1. This vacuum pressure serves in like manner to control the release of cards in the card holder 220 to the periphery of the drum 216.

A pair of spaced parallel conveyor belts 256 and 258 are positioned in the card holder 220. These belts are placed parallel to one another and to the walls 222 and 223. The belt 258 is placed adjacent the wall 222 and the belt 256 is placed adjacent the wall 223.

The conveyor belts 256 and 258 are mounted on suitable rollers similar to those described previously and in conjunction with Figure 2. Also, the drive of these conveyor belts may be by an electric motor similar to that described in conjunction with Figure 2. However, in the case of the reversible station of Figure 3, the drive motor for the belts 256 and 258 is made reversible in accordance with well known motor control principles. Also, the control motor is preferably coupled to the control of the retainer 252 and the stop 246. This control is such that, when the station is conditioned to function as a stacking station, as shown in Figure 4, the conveyor belts 256 and 258 move toward the rear of the card holder 220 (as shown by the arrows). On the other hand, when the station is controlled to operate as a feeding station as shown in Figure 3, the conveyor belts 256 and 258 move toward the mouth of the card holder 220 (as shown by the arrows). In this manner, the conveyor belts move in the proper direction to eliminate frictional drag when cards are fed into the holder 220 as in Figure 4, and they move in the proper reverse direction to remove frictional drag when cards are fed from the holder to the drum 216 as in Figure 3. This direction corresponds to the movement of the cards in the card holder 220 in the direction parallel to the walls 222 and 223. It should be appreciated that the term "transport means" as used in the claims is intended to include any suitable type of conveying apparatus as well as drums. It should also be appreciated that the term "cards" as used in the specification is intended to cover any type of discreet elements which are capable of recording and subsequently reproducing bits of information.

The invention provides, therefore, simple apparatus in which cards may be fed at a high rate of speed to a stacking station from a transporting drum or from a feeding station to the transporting drum. The apparatus of the invention permits such high rate of speed to be attained without any danger of the cards becoming misaligned or damaged. This results from the elimination of any frictional drag on the bottom edges of the cards during the transfer of the cards between the transporting drum and the various stations.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for processing data on a plurality of information storage cards, the combination of, a table top, a transporting drum rotatably mounted on said table top and constructed to receive a vacuum force at the peripheral surface of the drum for transporting the information storage cards in fixed position on its peripheral surface, card holding means including a pair of spaced and substantially parallel walls extending along said table top outwardly from the periphery of said transporting drum, said card holding means being constructed to support the cards in stacked relation between said walls with the lower edges of such cards resting on said table top, transfer means for transferring cards between said drum and said card holding means, at least one conveyor belt positioned on said table top between said walls and movable along a path substantially parallel to said walls and in the direction of movement of the lower edges of the cards in said card holding means radially with respect to the periphery of said drum, said conveyor belt thereby operating to effectively reduce frictional forces between such lower edges of the cards and said table top, pusher means slidably mounted in said card holding means for movement independent of said conveyor belt and constructed to retain the cards in the holding means in transverse relationship to the walls of the holding means, and resilient means for urging said pusher means forwardly in said card holder means toward said drum to hold the cards in closely stacked relationship in said holding means in transverse relationship to the walls of the holding means and to press the cards in said card holding means against the periphery of said drum.

2. In a system for processing data on a plurality of information storage cards, the combination of, a table top, a transporting drum rotatably mounted on said table top and constructed to receive a vacuum force at its peripheral surface for transporting the information storage cards in fixed position on its peripheral surface, card holding means including a pair of spaced and substantially parallel walls extending along said table top outwardly from the periphery of said transporting drum, said card holding means being constructed to support the cards in stacked relation between said walls with the lower edges of the cards resting on said table top, transfer means for transferring cards between said drum and said card holding means, a pair of spaced and substantially parallel conveyor belts positioned on said table top between said walls and movable along respective paths substantially parallel to said walls and in the direction of movement of such lower edges of the cards in said card holding means radially relative to the periphery of said drum, said conveyor belts operating thereby to effectively reduce frictional forces between such lower edges and said table top, a card pusher member extending across said card holding means between said walls and movable in said card holding means in a direction substantially parallel to said walls and independently of said conveyor belts, and a coiled spring affixed to said table top and coiled in a direction corresponding substantially to the movements of the cards in the card holding means and engaging said pusher member to urge said member forwardly in said card holding means to hold the cards in closely stacked relationship in said holding means and to press the cards in said card holder means against the periphery of said drum.

3. In a system for processing data on a plurality of information storage cards, the combination of: card holding means including a pair of spaced walls and a supporting surface for holding the cards in stacked relationship and in a transverse disposition within the card holding means relative to the walls of the card holding means, transport means disposed in coupled relationship to each leading card in the card holding means to provide a transfer of cards between the card holding means and the transport means, rotatable means disposed in co-operative relationship with the cards in the card holding means for rotating in a first direction to move the cards in a direction for facilitating the transfer of cards from the card holding means to the transport means and for rotating in an opposite direction to move the cards in a direction for facilitating the transfer of cards from the transport means to the card holding means, a pusher member disposed against the last card in the card holding means to exert a force for directing the cards in the card holding means toward the transport means independently of the force exerted by the last mentioned means and shaped to exert the force in a direction for maintaining the transverse disposition of the cards, and a coiled spring disposed within the card holding means and positioned against the cards and coiled in a direction corresponding to the movement of the cards in the card holding means and provided with a constraint to urge the pusher member against the cards.

4. In a system as set forth in claim 3, the pusher member having a leading surface in engagement with the trailing card in the card holding means and being provided with a configuration to maintain the leading surface in the transverse disposition and the transport means being disposed in direct physical engagement with the leading card in the card holding means to facilitate the transfer of cards between the transport means and the card holding means.

5. In a system for processing data on a plurality of information storage cards, the combination of: card holding means including a pair of spaced walls and a supporting surface for holding the cards in stacked relationship and in a transverse direction with respect to the walls of the card holding means, transport means movable in a closed loop and coupled directly to the cards in the card holding means for obtaining a removal of cards by friction from the card holding means and for obtaining a transfer of cards directly into the card holding means, a pusher member disposed at a position removed from the transport means to retain the cards in the card holding means between the pusher member and the transport means and provided with a face in coupled relationship to the cards in the card holding means and having a transverse disposition corresponding to the transverse disposition of the cards in the card holding means, a spring disposed in constrained relationship against the pusher member for acting upon the pusher member in a direction to retain the cards in tightly maintained relationship in the card holding means, and means movable in a closed loop and disposed in coupled relationship to the cards in the card holding means for acting upon the cards in one direction to facilitate the transfer of cards from the transport means to the card holding means and for acting upon the cards in an opposite direction to facilitate the transfer of cards from the card holding means to the transport means.

6. In a system as set forth in claim 5 in which the spring is a coiled spring capable of being wound or unwound in accordance with the number of cards in the card holding means and in accordance with the transfer of cards into or out of the card holding means and in which the coils of the spring are disposed in a plane substantially parallel to the direction of movement of the cards on the card holding means and in which the means movable in a closed loop includes a conveyor belt disposed at the bottom edges of the cards and movable in the first direction and in the opposite direction to facilitate the transfer of cards between the transport means and the card holding means and in which the transport means is a rotatable drum constructed to produce a movement of cards with the drum.

7. In a system for processing data on a plurality of information storage cards, the combination of: card holding means including a pair of spaced walls and a supporting surface for holding the cards in stacked relationship and for holding the cards in a transverse disposition relative to the direction of the walls of the card holding means, a rotatable drum having a peripheral surface and disposed in contiguous relationship to the cards in the card holding means to remove cards from the card holding means by friction of the peripheral surface of the drum against the cards and constructed to hold the cards in fixed position on the peripheral surface of the drum for movement with the drum, means including at least one member movable in a closed loop and coupled to the cards in the card holding means for operating on the cards, upon a movement of the member in one direction, to facilitate the movement of the cards into the card holding means upon a transfer of cards from the drum to the card holding means and for operating upon the cards, upon a movement of the member in the opposite direction, to facilitate the movement of the cards out of the card holding means upon a transfer of cards from the card holding means to the drum, means including a pusher member having a forward face disposed in the card holding means in the transverse relationship at a position in back of the cards to maintain the cards in stacked relationship in the particular transverse disposition, and means including a yieldable spring coiled in the direction of movement of the cards into and out of the card holding means to press the pusher member against the cards.

8. In a system as set forth in claim 7, the spring being disposed to become wound or unwound in accordance with the movement of cards into and out of the card holding means.

9. In a system as set forth in claim 7, the member movable in a closed loop being a conveyor belt disposed below the edges of the cards supported by the card holding means and movable in a direction corresponding to the direction of movement of the cards in the card holding means to produce a movement of the cards in the card holding means in a direction corresponding to the movement of the cards between the card holding means and the drum.

References Cited in the file of this patent

UNITED STATES PATENTS

| | | |
|---|---|---|
| 622,106 | Berry | Mar. 28, 1899 |
| 1,294,842 | Speiss | Feb. 18, 1919 |
| 2,163,732 | Kleineberg | June 27, 1939 |
| 2,241,268 | Nelson | May 6, 1941 |
| 2,525,741 | Von Hofe et al. | Oct. 10, 1950 |
| 2,791,424 | Noon | May 7, 1957 |